(12) United States Patent
Steijer et al.

(10) Patent No.: US 6,945,709 B2
(45) Date of Patent: Sep. 20, 2005

(54) OPTOCAPSULE UNIT FOR AN OPTOHYBRID ASSEMBLY, A LOWER CASING PART OF SUCH AN OPTOCAPSULE UNIT, AND AN OPTOELECTRONIC MODULE COMPRISING SAID OPTOCAPSULE UNIT AND AN OPTOHYBRID ASSEMBLY

(75) Inventors: Odd Steijer, Bromma (SE); Ulf Holm, Sollentua (SE); Paul Eriksen, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 6 days.

(21) Appl. No.: 10/479,419

(22) PCT Filed: Jun. 6, 2002

(86) PCT No.: PCT/SE02/01094

§ 371 (c)(1),
(2), (4) Date: Dec. 3, 2003

(87) PCT Pub. No.: WO02/103425

PCT Pub. Date: Dec. 17, 2002

(65) Prior Publication Data

US 2004/0161209 A1 Aug. 19, 2004

(30) Foreign Application Priority Data

Jun. 14, 2001 (SE) .............................................. 0102120

(51) Int. Cl.$^7$ ............................................... G02B 6/36
(52) U.S. Cl. ......................................... 385/92; 385/88
(58) Field of Search ................................ 385/14, 88–94

(56) References Cited

U.S. PATENT DOCUMENTS

| 6,181,854 | B1 | * | 1/2001 | Kojima et al. | ................. | 385/49 |
| 6,234,686 | B1 | * | 5/2001 | Tonai et al. | .................. | 385/88 |
| 6,309,113 | B1 | * | 10/2001 | Naito | ........................... | 385/88 |
| 6,457,876 | B1 | * | 10/2002 | Sawai | ......................... | 385/92 |
| 2001/0017964 | A1 | * | 8/2001 | Setoguchi | ..................... | 385/88 |

* cited by examiner

Primary Examiner—Frank G. Font
Assistant Examiner—Derek L. Dupuis

(57) ABSTRACT

An optocasule unit for an optohybrid assembly (10), said capsule unit comprising a lower casing part (36) and a compatible upper cover part (54) which together form, at one end (50) thereof, an integral receptacle section for obtaining an optomechanical interface and receiving and detachably holding therein an optical connector with at least one external optical fiber. A central section (38) of the lower casing part (36) has a cavity (42) for receiving, in a form-closed manner, a ferrule (12) of the optohybrid assembly (10). The lower casing part (36) has, at a second end thereof, a base plate (44) for supporting a substrate (20) having at least one optochip (26, 28) and a proximal end of at least one primary optical fiber (22, 24) mounted thereon. The cover part (54) also has a section (58) covering the substrate (20) and at least a portion of the base plate (44) of the lower part. The invention is also addressed to the lower casing part (36) of the optocapsule unit for enclosing an optohybrid assembly (10) therein, and to an optoelectronic module (62) comprising the capsule unit with an optohybrid assembly enclosed therein.

5 Claims, 4 Drawing Sheets

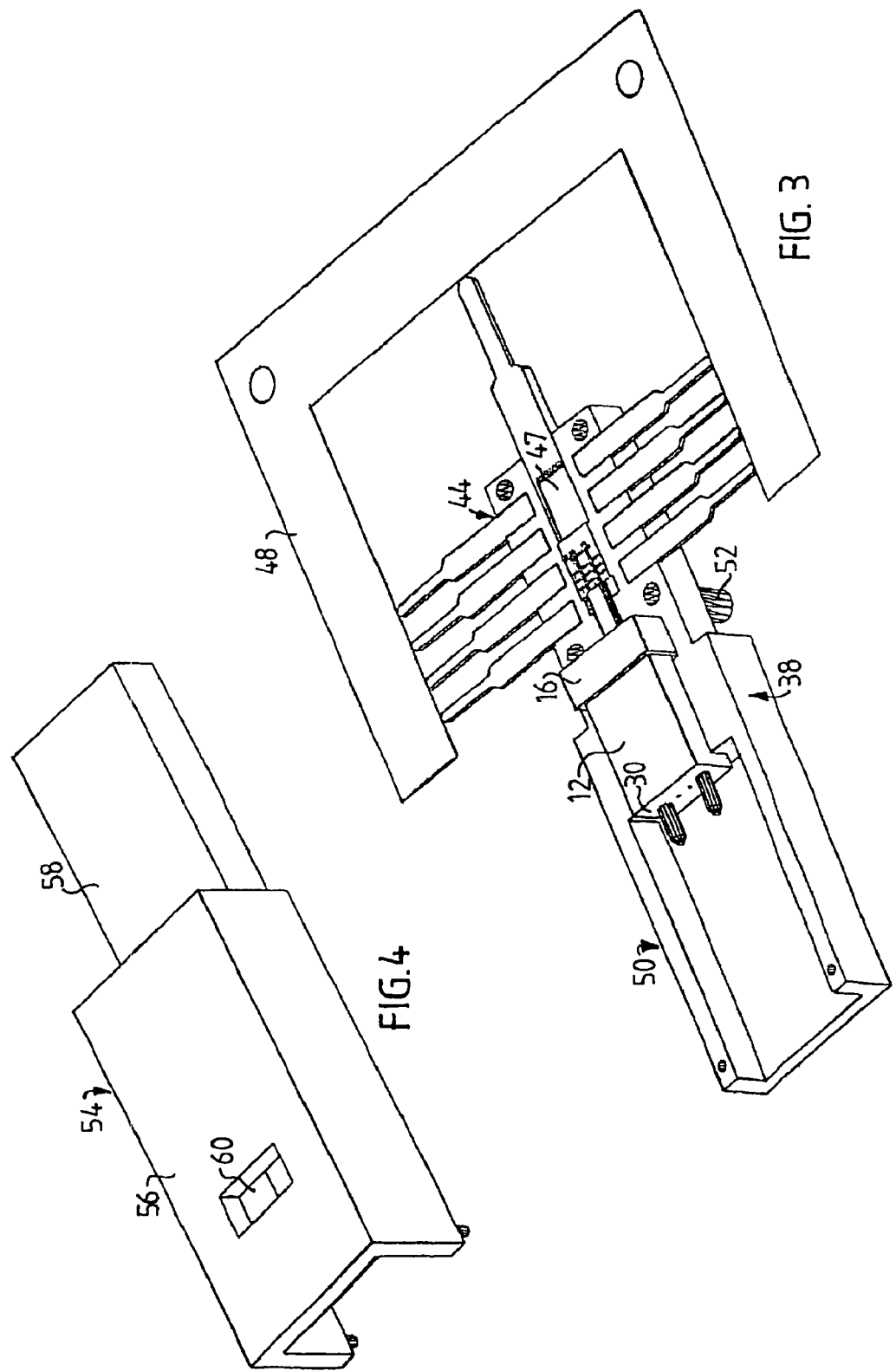

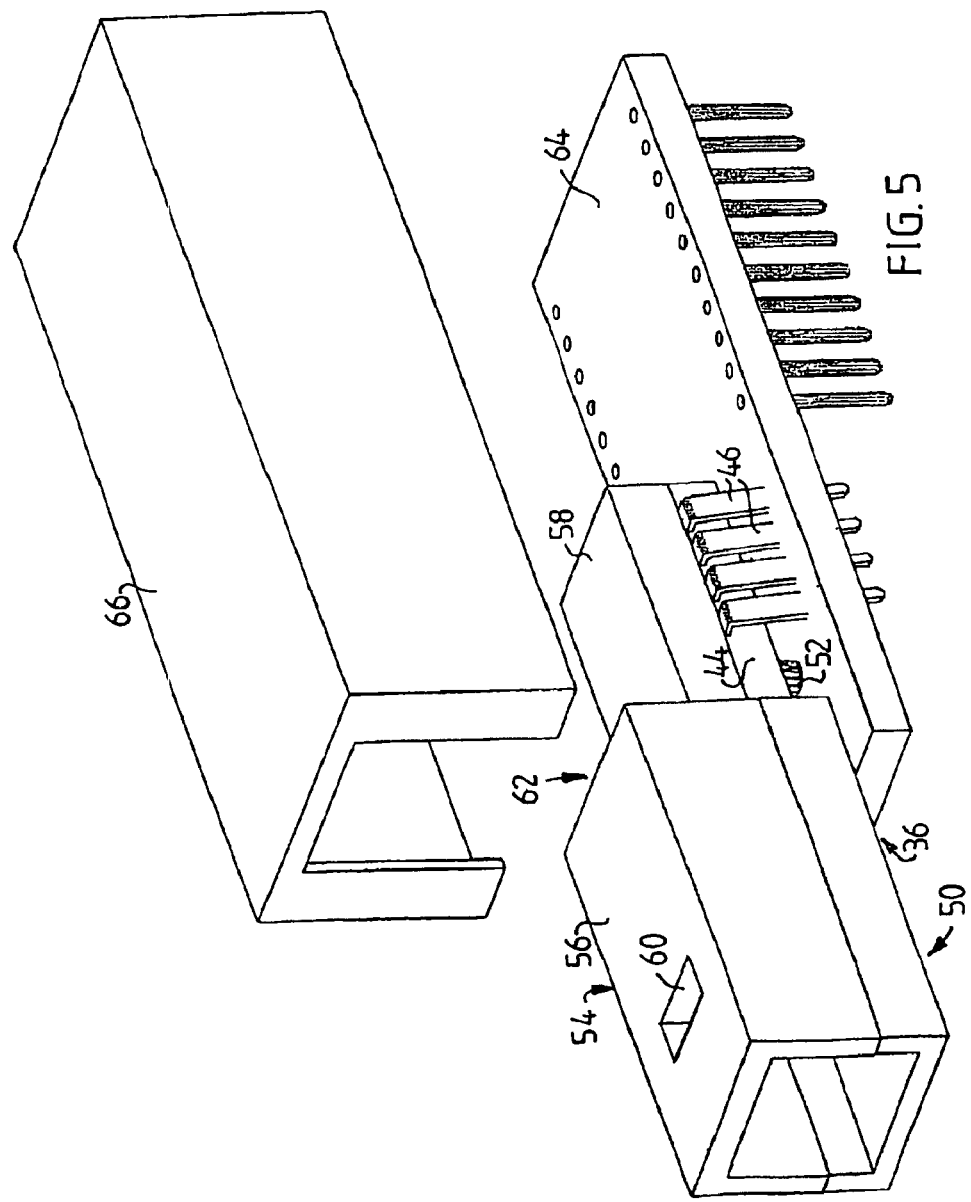

US 6,945,709 B2

OPTOCAPSULE UNIT FOR AN OPTOHYBRID ASSEMBLY, A LOWER CASING PART OF SUCH AN OPTOCAPSULE UNIT, AND AN OPTOELECTRONIC MODULE COMPRISING SAID OPTOCAPSULE UNIT AND AN OPTOHYBRID ASSEMBLY

TECHNICAL FIELD OF THE INVENTION

The present invention relates, in general, to optical semiconductor devices and, in particular, to packages for such devices.

BACKGROUND OF THE INVENTION

Conventional optical semiconductor devices for use in telecommunication systems can usually be connected to an external equipment through a so-called pigtail cord connected to an optical semiconductor chip, such as a laser diode of the device, or, more preferably, through a receptacle type of optomechanical interface to which an optical fiber of the external equipment may be connected.

U.S. Pat. No. 5,617,495 discloses semiconductor devices having a connecting structure of the receptacle type wherein an external fiber may be detachably connected to the optical assembly of the equipment. Although a receptacle type of optomechanical interface is preferred to pigtail arrangements due to a less complicated handling and mounting procedure, the known devices of the receptacle type are still not optimized as far as versatility and accurate, easy assembly and automatization of the production of the components are concerned.

SUMMARY OF THE INVENTION

It is an object of the present invention to provide an improved optocapsule unit for an optohybrid assembly, wherein:

a) a group of electrical lead pins is integrally formed in a front portion of a lower casing part of the capsule unit so that a substrate of the optohybrid assembly supported thereon may be easily wire-bonded to the lead pins;

b) a recess in a central portion of said lower casing part of the optocapsule unit is formed for an accurate, form-closed positioning of a ferrule of the optohybrid assembly therein so as to secure a well-defined location of an optomechanical interface of the capsule unit; and c) a receptacle for detachably receiving an external optical fiber connector is integrally formed in a rear portion of the lower casing part.

BRIEF DESCRIPTION OF THE DRAWINGS

FIG. 3 is a view similar to FIG. 2 showing the optohybrid assembly mounted to the lower casing part;

FIG. 4 is a perspective view of an upper casing part (cover) of the capsule unit; and FIG. 5 is an exploded perspective view of an optoelectronic submodule formed by the capsule unit of the invention and the optohybrid assembly mounted therein, where the submodule is mounted in its turn on a PCB with a shielding metal cover placed above it.

DESCRIPTION OF A PREFERRED EMBODIMENT

Figure 1:
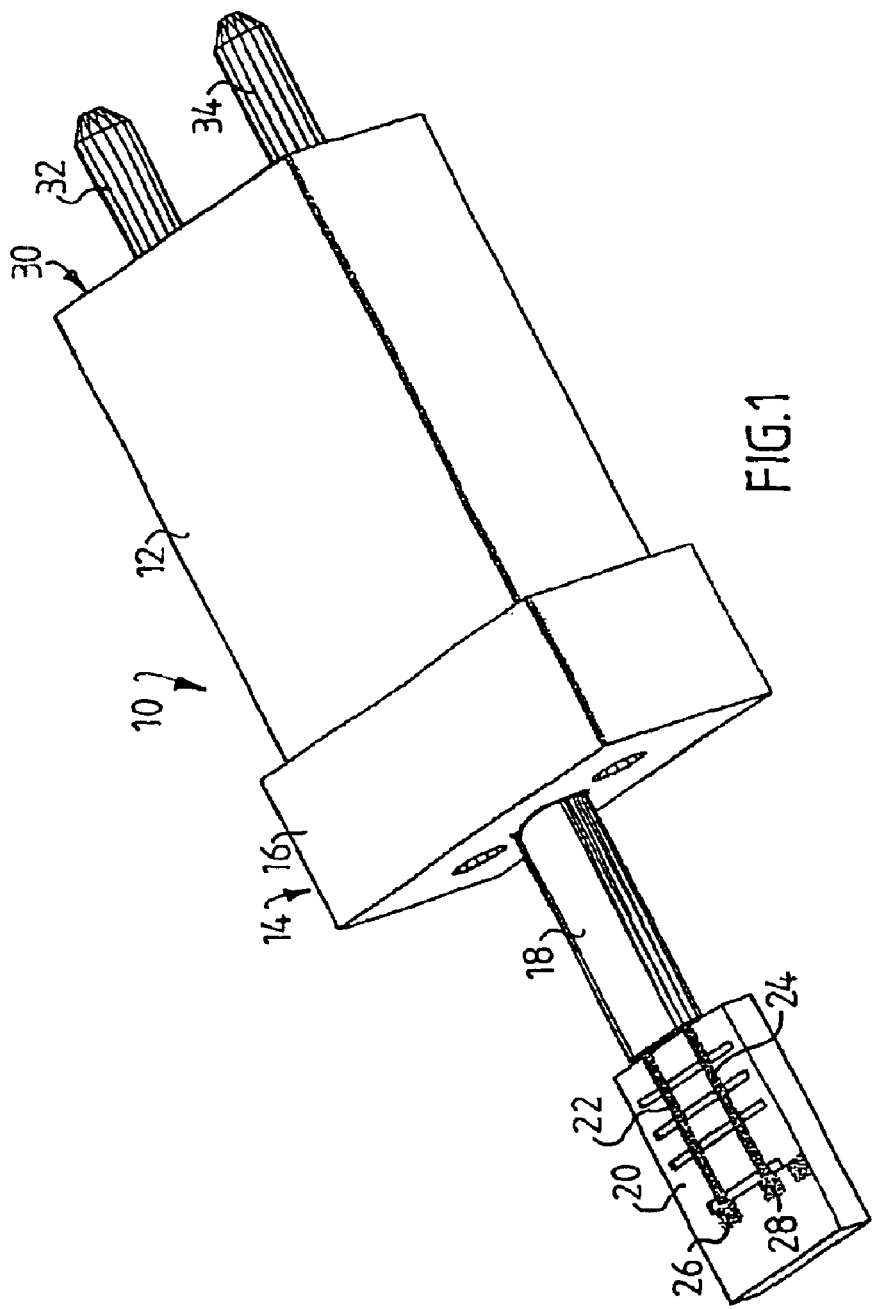
FIG. 1 is perspective view of an optohybrid assembly intended to be mounted in a capsule unit of the present invention.

FIG. 1 illustrates an optohybrid assembly 10 for e.g. telecommunication systems. The optohybrid assembly comprises a main body, a so-called ferrule 12 of a square cross-section which, at a first end portion 14 thereof, has an enlarged flange 16. An unpeeled section 18 of a fiber ribbon with two optical fibers extends from the flange 16 towards a silicon substrate 20, where two fibers 22,24 are attached to and supported in U- or V-grooves (not shown) in the substrate 20 and extend up to the immediate proximity of two respective optochips 26,28, such as laser diodes, with which the proximal ends of the fibers 22,24 are appropriately aligned. Furthermore, the fibers 22,24 extend through fine lumens (not shown) in the ferrule 12, and distal ends of the fibers terminate at the opposite end surface 30 of the ferrule 12, where they form an optical interface for an optomechanical connection with an external optical fiber connector (not shown) having optical fibers, whose proximal ends are aligned with the distal ends of the fibers 22,24. Guide pins 32,34 are attached to the ferrule 12 for ensuring an accurately aligned connection of the external connector. The optohybrid assembly 10, i. e. the ferrule 12, the silicon substrate 20 with optochips 26,28 and optical fibers 18,22, 24, constitutes a discrete testable unit as far as the function of the optichips is concerned.

Figure 2:
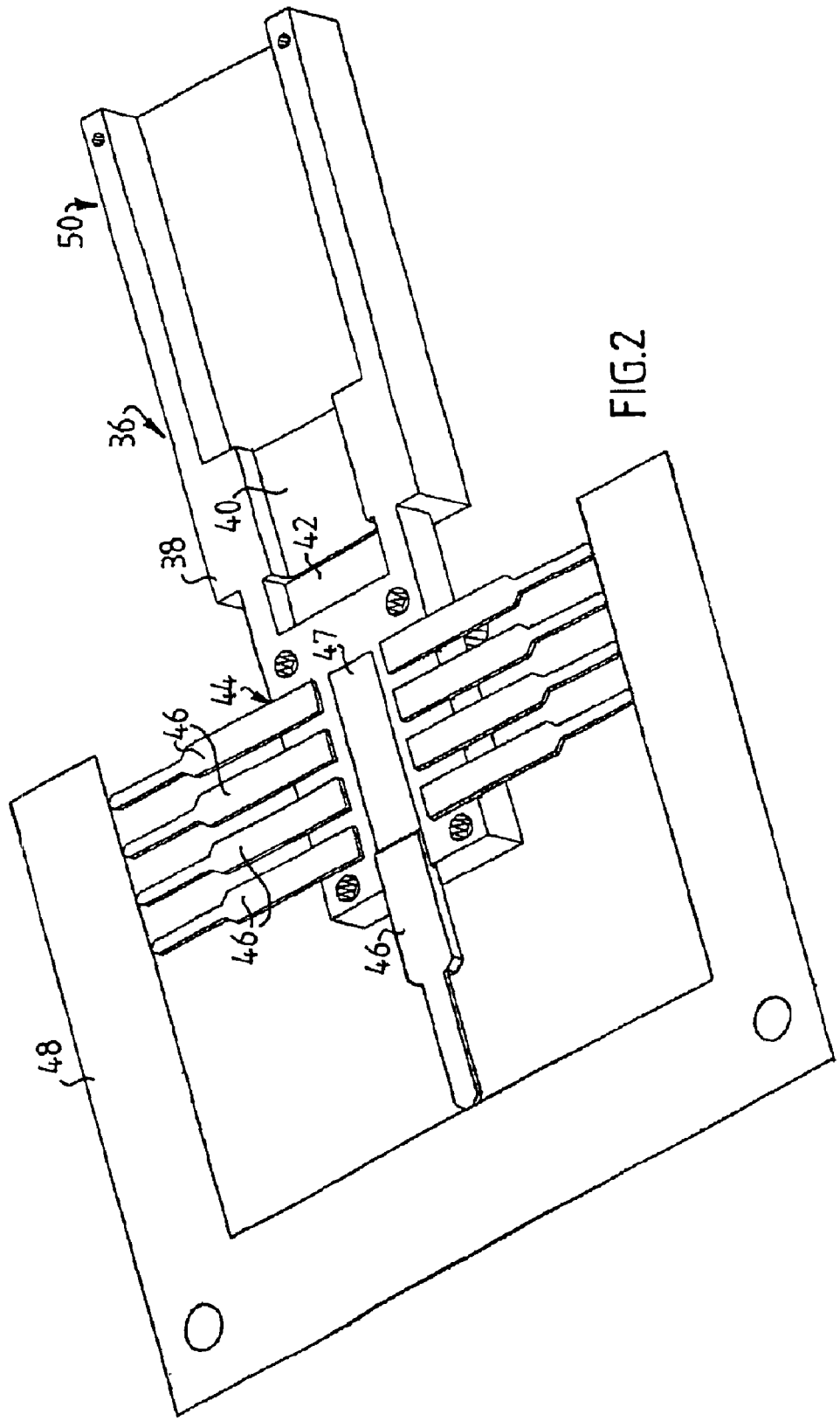
FIG. 2 is a perspective view of a lower case part of the capsule unit and a frame of electrical lead pins integrated therewith.

FIG. 2 illustrates a lower casing part 36 of a capsule unit of the present invention for a non-hermetical encapsulation of the optohybrid assembly 10. The lower casing part 36 has a central portion 38 with a recess 40 and a cavity 42 for receiving and retaining the ferrule 12 in a form-closed manner with the flange 16 positioned in the cavity 42. The lower casing part 36 has a front base plate portion 44 provided with groups of electrical lead pins 46 integrally formed therewith and adapted to be connected by wire-bonding to the silicon substrate 20 or the optochips 26, 28 and any microelectronic chips (not shown) supported on respective substrates placed on recessed area 47 of the base plate portion 44, as shown in FIGS. 2 and 3. The lead pins 46 may be broken away from their support frame 48 and bent downwardly for insertion in respective mounting holes in associated printed circuit boards (PCB) in a conventional manner. Alternatively, the pins or leads may be shaped for surface-mounting on a PCB. Furthermore, the lower casing part 36 has a rearwardly extending portion 50 forming part of a receptacle, e.g. a so called MT-RJ or LC type receptacle, for receiving therein a fiber optic connector of any suitable standard type, such as a MT-RJ or LC type of connector. Load-relieving projections or pins 52 may be provided on the underside of the lower casing part 36 for taking up forces exerted on the capsule unit when mounted on a PCB or the like. The lower casing part 36 is formed in a shape-stable thermoplastic material by an injection molding process directly on the metal frame of electrical lead pins 46.

The capsule unit further comprises an upper casing part 54 (FIG. 4) serving as a cover for the lower casing part 36 and also made of a shape-stable plastic material such as epoxy resin. Mounted on top the lower casing part 36 a rear portion 56 of the cover 54 defines, together with the rear portion 50 of the lower casing part 36, a well-defined optomechanical interface for connection of an external optical fiber connector (not shown) to the optohybrid assembly 10, whereas a front portion 58 of the cover 54 forms a mechanical protection for the optoelectronic components mounted on the front base plate portion 44 of the lower casing part 36. The lower and upper casing parts 36, 54 may have snap-lock fastening means (not shown) for easy assembly and mutual fixation of the casing parts. Alternatively, the parts 36, 54 may be bonded together by an adhesive. The cover 54 has an aperture 60 for receiving a clasp on the connector to thereby obtain a detachable connection of the latter in the optomechanical receptacle.

The encapsulation procedure is initiated by placing the optohybrid assembly 10 on the lower casing part 36 so that the ferrule 12 and the flange 16 are positioned in a form-closed manner in their respective recess 40 and cavity 42 and fixated therein by glue or any other adhesive. The silicon substrate 20, and any other substrate with microelectronic chips, is likewise attached to the front base plate by glue-bonding. All necessary wire-bonding steps are then carried out between the respective silicon substrates and the leads 46. The cover 54 is attached to the lower casing part 36 to thereby firmly hold the optohybrid assembly 10 in an accurately predetermined position. Thus, the lower casing part 36 of the capsule unit provides for an electrical and thermal connection of the optohybrid assembly 10 to the electrical lead pins 46, and a mechanical connection of the assembly 10 into recesses 40, 42 in the lower casing part 36 to thereby obtain an accurate positioning of the ferrule 12 and the substrate 20 in the lower casing part 36 as well as a predetermined optomechanical interface in a rear integral receptacle section of the capsule unit.

As shown in FIG. 5, the capsule unit 36, 54 of the invention and the optohybrid assembly 10 mounted therein may constitute an optoelectronic submodule 62, which in its turn may be mounted on a printed circuit board (PCB) 64 containing electronic components (not shown), with a shielding metal cover 66 placed thereabove.

what is claimed is:

1. An optocapsule unit for an optohybrid assembly (10), comprising:

a lower casing part (36) and a compatible upper cover part (54), wherein said lower casing part and said upper cover part together form, at one end (50) thereof, an integral receptacle section for obtaining an optomechanical interface and receiving and detachably holding therein an optical connector with at least one external optical fiber, a central section (38) of the lower casing part (36) having a cavity (42) for receiving, in a form-closed manner, a ferrule (12) of the optohybrid assembly (10), said ferrule (12) defining at a first surface (30) thereof an optical interface for alignment of a distal end of at least one primary optical fiber (22, 24) extending through said ferrule (12) with a proximal end of the external optical fiber, said primary optical fiber having an exposed section (22,24) protruding from a second surface of the ferrule (12) and terminating at a proximal end, said lower casing part (36) having, at a second end thereof, a base plate (44) for supporting a substrate (20) having at least one optochip (26,28) and the proximal end of the primary optical fiber (22,24) mounted thereon, wherein said cover part (54) has a section (58) covering the substrate (20) and at least a portion of the base plate (44) of the lower part (36), and wherein said assembly includes an aperture (60) through said integral receptacle section for receiving a clasp on said optical connector, whereby said optical connector can be detachably connected to said optohybrid assembly (10).

2. Optocapsule unit according to claim 1, wherein the lower and upper casing parts (36,54) are made of a shape-stable plastic material.

3. A lower casing part of an optocapsule unit for enclosing an optohybrid assembly (10), wherein a frame structure (48) of electrical lead pins (46), to be wire-bonded to at least one optochip (26,28) via a substrate (20), is integrally molded to a base plate of a first end portion (44) of said lower casing part (36), a second end portion (50) of said lower casing part (36) defining an integral receptacle section for obtaining an optomechanical interface and receiving and detachably holding an optical connector with at least one external optical fiber, wherein a central section (3 8) of the lower casing part (36) has a cavity (42) for receiving, in a form-closed manner a ferrule (12) of the optohybrid assembly (10) and wherein said lower casing part is adapted to be coupled to an upper cover part including an aperture (60) for receiving a clasp on said optical connector, whereby said optical connector can be detachably connected to said optocapsule unit.

4. Optoelectronic module (62), comprising a capsule unit (36,54) enclosing an optohybrid assembly (10), said optohybrid assembly (10) comprising:

a ferrule (12) including at a first surface (30) thereof an optical interface for alignment and detachable connection of a distal end of at least one primary optical fiber (22,24) extending through said ferrule (12) to a proximal end of at least one secondary, external optical fiber, said primary optical fiber having an exposed section protruding from a second surface of the ferrule (12) and terminating at a proximal end; and a substrate (20) supporting thereon at least one optochip (26,28), said proximal end of the primary optical fiber being aligned in close proximity with the respective optochip (26,28) and fixated to the substrate (20), wherein:

said capsule unit comprises a lower casing part (36) and a compatible upper cover part (54), wherein said parts together form, at one end (50) thereof, an integral receptacle section for receiving and detachably holding an optical connector carrying said at least one secondary, external optical fiber; and a central section (38) having a cavity (42) for receiving the ferrule (12) in a form-closed manner, wherein said lower casing part (36) has, at a second end thereof, a base plate (44) provided with integrated electrical lead pins (46) wire-bonded to the optochip (26,28) via the substrate (20) and supporting said substrate (20) having said optochip and the proximal end of the primary optical fiber (22,24) mounted thereon, and wherein said cover part (54) has a section (58) covering the substrate (20) and at least a portion of the base plate (44) of the lower casing part (36), and wherein said capsule unit includes an aperture (60) through said integral receptacle section for receiving a clasp on said optical connector, whereby said optical connector can be detachably connected to said optohybrid assembly (10).

5. Optoelectronic module according to claim 4, wherein at least one substrate supporting microelectronic component is mounted (at 47) on the base plate (44).

\* \* \* \* \*

UNITED STATES PATENT AND TRADEMARK OFFICE
CERTIFICATE OF CORRECTION

PATENT NO. : 6,945,709 B2
APPLICATION NO. : 10/479419
DATED : September 20, 2005
INVENTOR(S) : Odd Steijer et al.

It is certified that error appears in the above-identified patent and that said Letters Patent is hereby corrected as shown below:

On the Title page, in Item (87), under "PCT Pub. Date", in column 1, Line 2, delete "Dec. 17, 2002" and insert -- Dec. 27, 2002 --, therefor.

In Column 2, Line 30, delete "optichips" and insert -- optochips --, therefor.

In column 4, Line 15, in Claim 3, delete "(3 8)" and insert -- (38) --, therefor.

Signed and Sealed this

Twentieth Day of November, 2007

JON W. DUDAS
*Director of the United States Patent and Trademark Office*